March 21, 1939.   C. F. BIERBACH   2,150,907
DIRECTION INDICATING DEVICE FOR MOTOR VEHICLES
Filed July 7, 1937   2 Sheets-Sheet 1
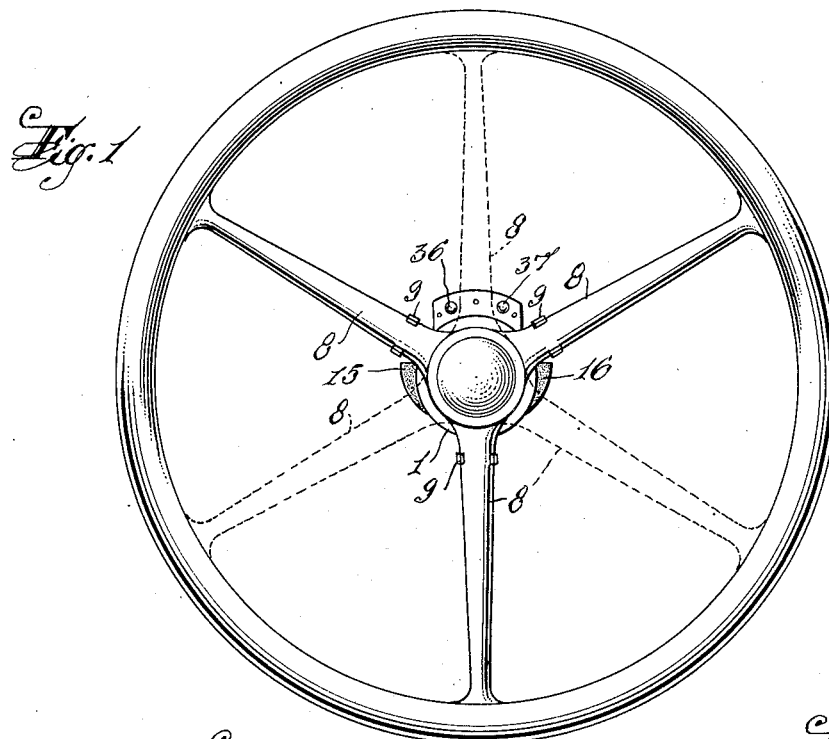
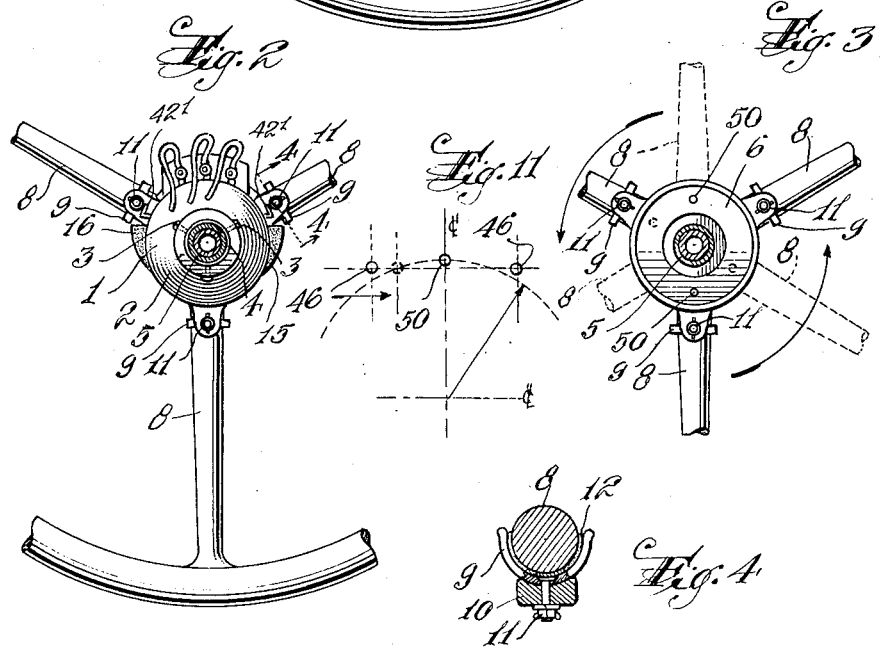
INVENTOR
Carl F. Bierbach
BY Fredk C. Fischer
ATTORNEY March 21, 1939. C. F. BIERBACH 2,150,907
DIRECTION INDICATING DEVICE FOR MOTOR VEHICLES
Filed July 7, 1937 2 Sheets-Sheet 2
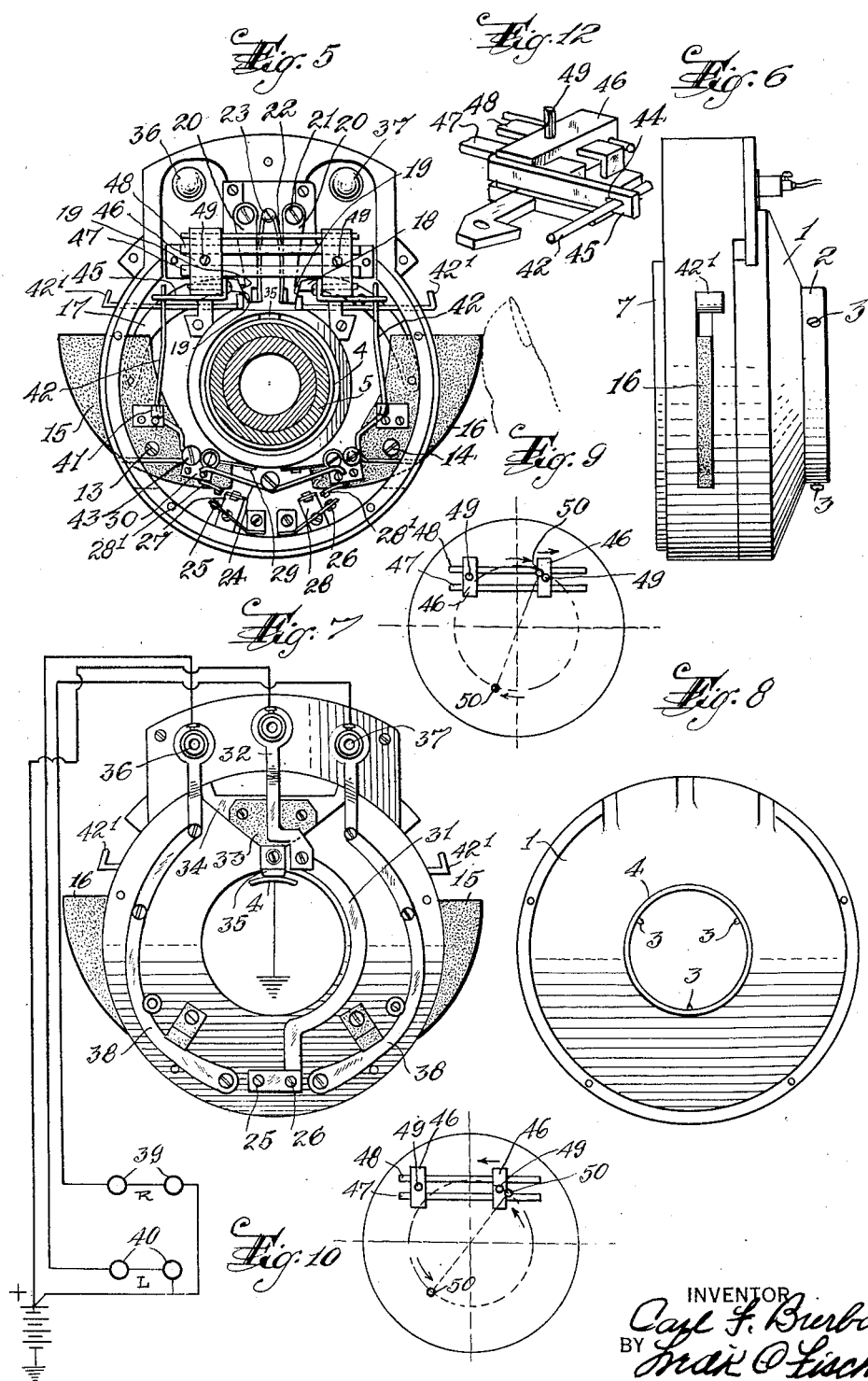

Patented Mar. 21, 1939

2,150,907

UNITED STATES PATENT OFFICE 2,150,907

DIRECTION INDICATING DEVICE FOR MOTOR VEHICLES

Carl F. Bierbach, Newark, N. J., assignor to A. D. S. Corp., a corporation of New Jersey Application July 7, 1937, Serial No. 152,301

7 Claims. (Cl. 200—59)

This invention relates to signalling devices for motor vehicles and more particularly to improvements for indicating the direction in which the motor vehicle is to be turned.

With closed automobiles and large trucks, it is often difficult and inconvenient for the driver to indicate to drivers of following and approaching vehicles, the direction in which the vehicle is to be turned. This is especially true in the winter time when it is necessary to keep the windows closed. Also, trucks are now built of such a size that it is impractical for the driver to extend his hand beyond the sidewalls of the truck to indicate a turn.

It is, therefore, an object of this invention to provide a device positioned on the steering post adjacent the steering wheel within easy reach of the hands of the driver of the motor vehicle, for indicating the direction in which the vehicle is to be turned. The device is preferably mounted on the steering post beneath the steering wheel, and provided with finger pieces which can be readily and conveniently manipulated by the fingers of the driver without necessitating the removal of the hand from the steering wheel.

A further object is the provision of a direction indicating device for motor vehicles, which device is simple in structure and positive in operation, and will not readily get out of order no matter how frequently it may be used.

A further object is the provision in a direction indicating device for motor vehicles, of means for automatically returning the parts of the device to a neutral position after the motor vehicle has made the desired turn indicated by the device, and again straightened out.

A further object of the invention is the provision of an indicating device for motor vehicles, having means which enable the continuance of the signal as long as the vehicle is being turned in the same direction; and means to automatically return the parts to a neutral position and discontinue the signal only when the vehicle has been straightened out to go forward in a straight line.

A further object of the invention is the provision of an indicating device on a motor vehicle, which enables the production of a signal to following and approaching vehicles when it is desired to pass on the road a preceding vehicle, the device having means to automatically discontinue the signal after the preceding vehicle has been passed.

A further object is the provision of an indicating device which can be readily and conveniently installed on any type of motor vehicle without material alteration.

These and other advantageous objects, which will later appear, are accomplished by the simple and practical construction and arrangement of parts hereinafter described and exhibited in the accompanying drawings, forming part hereof, and in which:

Fig. 1 is a plan view of an automobile steering wheel having my device attached thereto, Fig. 2 is a view of an underside of a steering wheel and the device embodying my invention, Fig. 3 is a view similar to Fig. 2 with certain parts removed, Fig. 4 is a sectional view taken on line 4—4 of Fig. 2, Fig. 5 is a plan view of my device with the cover removed showing parts in detail, Fig. 6 is a side elevational view of the device, Fig. 7 is a view of the underside of a casing used in the device showing a wiring arrangement, Fig. 8 is a view of the underside of the casing, Figs. 9, 10 and 11 are diagrammatic views illustrating the action of detent releasing members used in the device during the rotation of the steering wheel, in making a right hand turn, and then returning to the normal straight position, and Fig. 12 is a perspective view of elements used in the device.

Referring to the drawings, the indicating device is shown to comprise a casing 1, having a collar portion 2 on the underside thereof which is attached by means of set screws 3 to a brass tube 4, which is tightly fitted to a steering post 5 (see Fig. 3).

The casing is provided with a cover 6 which fits over a flange 7, on the casing 1, said cover being attached to the spokes 8 of a steering wheel by means of fork members 9 which extend beyond the diameter of the spokes. The fork members 9 are supported by extensions 10 projecting from the cover, said extensions carrying set screws 11, which firmly clamp the members 9 to the spokes. In order to prevent marring of the spokes, the members 9 are separated from the spokes by means of a sheet 12 of felt or a similar material.

Referring to Fig. 5, pivotally mounted at 13 and 14 in the casing 1 are levers 15 and 16, made of an insulating material, a portion of the levers extending beyond the outer walls of the casing. Pivotally connected to the levers 15 and 16 are levers 17, which are pivotally supported by the casing. Each of the levers 17 has one end 18 thereof bevelled and adapted to rest upon shoulder 19 of an arm 20, pivoted at 21 and having an inclined face adjacent the shoulder 19. The arms 20 are normally urged outwardly from each other by a bowed spring 22 secured to the casing at 23.

The levers 15 and 16 have one end thereof receiving the ends of a spring 24 which normally tends to rotate the levers 15 and 16 to cause them to project beyond the walls of the casing.

Attached to the casing between the lower ends of levers 15 and 16, (see Fig. 5) are contact members 25 and 26.

Also attached to the casing are contact members 27 and 28. The lower ends of levers 15 and 16 are provided with contact members 29 which are integral with a plate 30 having an edge thereof provided with contacts 28' projecting beyond the lower edges of levers 15 and 16.

The contacts 29 and 24, and 25, are so positioned that when the lever 15 is moved into the casing, contact 29 will engage contact 27 and the contact 28' on the plate 30 will engage the contact 25. The contact members 25 and 26, (see Fig. 7, which is a view of the underside of the casing) are connected by a metal strip 31, which in turn is connected to a strip 32 and thence to a positive terminal of a battery. The strip 32 rests upon a small sheet of insulating material 33 which prevents contact of strip 32 with a metal plate 34 having an arm 35 thereof bearing against the brass tube 4 which is fitted over the steering post, thus grounding the plate 34. Mounted in the casing are small incandescent lamps 36 and 37 which indicate to the driver the direction of turning for which the device has been set. The lamps 36 and 37 are grounded by means of the plate 34.

When the lever 15 is moved into the casing, contact is made between contacts 29 and 27 and 30 and 25 which action closes the electrical circuit between bar 31 which is connected to the positive terminal of the battery and a bar 38 which is connected to lamp 36. Since the lamp 36 is grounded, it will be lighted. The lamps 36 and 37 are each connected by means of cords or wires to indicating lamps 39 and 40 on the rear and front of a motor vehicle, the lamps 39 and 40 being in turn connected to the positive terminal of the battery, so that when lamp 36 or 37 is lighted, lamps 40 or 39 will also be lighted. Therefore, it will be seen, that the device is fool-proof in that lamps 39 and 40 cannot be lighted without lamp 37 or 36 being lighted, so that a driver has only to observe lamps 36 and 37 to know positively whether the device has been properly set to indicate either a right or left turn.

In the above description, mention has been made specifically to lamp 36 only. However, it should be noted that the circuit for lamp 37 is identically the same.

Attached to lever 15 is a small block 41 through which passes a wire spring 42 having one end fixed to the lever 15 at 43, the other end of the spring passing through a slot 44 in an arm 45, attached to a block 46 which is slidably mounted upon bars 47 and 48.

Inasmuch as the structure for lever 15 is identically the same structure for lever 16, the description will be confined to only one of the levers.

The block 46 has projecting from the upper surface thereof a bevelled pin 49 which is normally urged to a predetermined position by the spring 42. The cover 6 has projecting from the underside thereof two diametrically positioned pins 50 which are arranged to normally engage the pin 49 when the wheel is rotated in the direction in which a turn is desired to be made.

In operation, when it is desired to make a turn, for example to the left, lever 15 is pressed into the casing which will close circuits through lamps 36 and rear tail light 40 to communicate to the following vehicles that a turn is to be made to the left. As the wheel is turned to the left one of the pins 50 will engage pin 49 and move block 46 to the left, against the action of spring 42. Block 46 will slide along the rods 47 and 48 and thus the pin 49 will be moved out of the path of pin 50 and the rotation of the wheel can continue in the same direction without affecting the setting caused by moving lever 15 into the casing. In other words, the lamps 36 and 40 will remain lighted as long as the wheel is turned in the same direction.

When the wheel is rotated in an opposite direction to straighten out the front wheels of the automobile, block 46 has been moved by spring 42 to its normal position and pin 49 will lie in the path of one of the pins 50, so that when the wheel is rotated to the right, pin 50 will engage pin 49 and move the block 46 to the right to move arm 20 inwardly against the action of bow spring 22 and thus disengage the end of the arm 17 from the shoulder on arm 20 so that spring 24 can return lever 15 and the other parts to their normal neutral positions.

Sometimes the levers 15 and 16 are pressed inwardly to denote a turn, and then the operator changes his mind and does not make the turn. Under such circumstances, the parts of the indicating device can be returned to their neutral positions by pressing inwardly on either of the members 42' which are slidably mounted in the casing. Inward movement of the members 42' will force either of members 20 inwardly, and thus disengage the end 18 of lever 17 from shoulder 19.

From the above description it will be seen that there has been provided an indicating device for designating to following and approaching vehicles, the direction in which a turn is to be made and the device will continue to indicate such turn as long as the vehicle is turned in the same direction. When the vehicle is turned in an opposite direction to straighten out, the indicating device will be automatically returned to its normal neutral position whereby no indications will be made at all. This device obviously is highly desirable for motorists and is a decided improvement over indicating devices heretofore provided, in that the device will continue to indicate the direction of turning until the vehicle has again been straightened out to go in a straight line.

The foregoing disclosure is to be regarded as descriptive and illustrative only, and not as restrictive or limitative of the invention, of which obviously embodiments may be constructed including many modifications, without departing from the general scope herein indicated and denoted in the appended claims.

Having thus described my invention, what I claim as new and desire to secure by Letters Patent, is:

1. In a direction indicating device for motor vehicles, a casing adapted to be mounted upon a steering post, a lever pivotally mounted in said casing, means tending normally to cause a portion of said lever to project outside of the casing, contact means on said lever for closing an electrical circuit through direction indicating lamps when said projecting portion of the lever is moved into the casing, detent means for holding said lever in a circuit closing position, a rod mounted in said casing, a block slidably mounted on the rod and having a pin projecting therefrom, a cover for the casing and rotatable with a steering wheel, said cover having a pair of diametrically arranged pins mounted on the underside thereof and positioned to normally engage the pin on the block to slide the block along the rod, and spring means to normally maintain the block in a predetermined position on the rod so that when the steering wheel and cover are moved to a position to straighten out the guide wheels of the vehicle, the block will disengage the detent to enable the parts to be restored to a neutral position.

2. In a direction indicating device for motor vehicles, a casing adapted to be mounted upon a steering post, a lever pivotally mounted in said casing, means tending normally to cause a portion of said lever to project outside of the casing, contact means on said lever for closing an electrical circuit through direction indicating lamps when said projecting portion of the lever moves into the casing, detent means for holding said lever in a circuit closing position, a block slidably mounted in the casing and having a pin projecting therefrom, a member carried by the steering wheel and rotatable therewith, said member having a pin mounted on the underside thereof and positioned to normally engage the pin on the block to slide the block in either direction, and spring means to normally maintain the block in a predetermined position so that when the steering wheel and member are moved in a direction to cause the vehicle to move in a straight line the block will cause the disengagement of the detent means to enable the parts to be restored to a neutral position.

3. In a direction indicating device for motor vehicles, a casing adapted to be mounted on a steering post, levers pivotally mounted in said casing, means controlled by said levers to close electrical circuits through indicating lamps to indicate the direction in which the vehicle is to be turned, detents to maintain said circuits continuously closed during the turning of the vehicle in a direction indicated, a block slidably mounted in the casing adjacent said detent, said block having a pin projecting therefrom, a member carried by the steering wheel and having a pin mounted thereon adapted to engage the pin on the block and slide the block, spring means tending normally to hold the block in a predetermined position, said pin on said member engaging the pin on the block to move the block to release said detents when the vehicle is turned in a direction opposite to that indicated.

4. In a direction indicating device for motor vehicles, a casing adapted to be mounted upon a steering post adjacent the steering wheel, a lever pivotally mounted in said casing, resilient means normally causing a portion of said lever to project outside of the casing, contacts on said lever for closing an electrical circuit when said projecting portion of the lever is moved into the casing, detent means for holding said lever in a circuit closing position, a block slidably mounted in the casing and having a pin projecting therefrom, a member carried by the steering wheel and rotatable therewith, pins mounted on said member and positioned to engage the pin on the block to slide the block in either direction, means to normally maintain the block in a predetermined position so that when the steering wheel is turned to cause the vehicle to move in a straight line the block will disengage the detent means to enable the parts to be restored to their neutral positions.

5. In a direction indicating device for motor vehicles, a casing adapted to be mounted on the steering post, a lever pivotally mounted on said casing, resilient means normally causing a portion of the lever to project outside of the casing, contact means on the lever for closing an electrical circuit when said projecting portion of the lever moves into the casing, a second lever pivoted in the casing and adapted to be engaged by the first lever, and an arm having a shoulder thereon adapted to engage an end of the second lever, spring means constantly tending to move said arm towards the second lever, a block slidably mounted in the casing and adapted to engage said arm, a pin projecting from said block, a member carried by the steering wheel and rotatable therewith, pins mounted on the underside of said member and positioned to normally engage the pin on the block to slide the block in either direction, and spring means to normally maintain the block in a predetermined position so that when the steering wheel and member are turned to cause the vehicle to move in a straight line the block will be forced against said arm to disengage the end of the second lever from the shoulder on the arm to enable the parts to be restored to a neutral position.

6. In a direction indicating device for motor vehicles, a casing adapted to be mounted upon a steering post adjacent the steering wheel, a lever pivotally mounted in said casing, resilient means normally causing a portion of said lever to project outside of the casing, contacts on said lever for closing an electrical circuit when said projecting portion of the lever is moved into the casing, detent means for holding said lever in a circuit closing position, a block slidably mounted in the casing and having a pin projecting therefrom, a member carried by the steering wheel and rotatable therewith, said member being mounted directly above the casing and having pins projecting from the underside thereof and arranged to engage the pin on the block to slide the block in either direction, means to normally maintain the block in a predetermined position so that when the steering wheel is turned to cause the vehicle to move in a straight line the block will disengage the detent means to enable the parts to be restored to their neutral position.

7. In a direction indicating device for motor vehicles, a casing adapted to be mounted on a steering post, levers pivotally mounted in said casing, means controlled by said levers to close electrical circuits through indicating lamps, to indicate the direction in which the vehicle is to be turned, detents to maintain said circuits continuously closed during the turning of the vehicle in the direction indicated, blocks slidably mounted in the casing adjacent said detent, said blocks having pins projecting upwardly therefrom, spring means tending normally to hold the blocks in predetermined positions, a member mounted directly above the casing and carried by the steering wheel, said member having pins projecting from the underside thereof and arranged to engage the pins on the blocks to slide the blocks to release said detents when the vehicle is turned in a direction opposite to that indicated.

CARL F. BIERBACH.